(12) United States Patent
Nowka

(10) Patent No.: US 6,405,231 B1
(45) Date of Patent: Jun. 11, 2002

(54) METHOD AND APPARATUS FOR ROUNDING INTERMEDIATE NORMALIZED MANTISSAS WITHIN A FLOATING-POINT PROCESSOR

(75) Inventor: Kevin John Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,270

(22) Filed: Mar. 31, 1999

(51) Int. Cl.[7] .................................................. G06F 7/38
(52) U.S. Cl. ...................................................... 708/497
(58) Field of Search ................................ 708/495, 496, 708/497, 498, 499, 550, 551, 552, 553, 672

(56) References Cited

U.S. PATENT DOCUMENTS 4,648,058 A * 3/1987 Masumoto .................. 708/551
5,198,993 A * 3/1993 Makakura ................... 708/714
5,781,464 A * 7/1998 Mehta ........................ 708/495

* cited by examiner

*Primary Examiner*—Chuong Dinh Ngo
(74) *Attorney, Agent, or Firm*—Casimer K. Salys; Bracewell & Patterson, L.L.P.

(57) ABSTRACT

An apparatus for rounding intermediate normalized mantissas within a floating-point processor is disclosed. The apparatus for rounding intermediate normalized mantissas within a floating-point processor includes an AND circuit, a selection circuit, and a multiplexor. The AND circuit generates an AND signal and its complement from a normalized mantissa. The selection circuit generates a select_AND signal and its complement from the normalized mantissa. The multiplexor, which is coupled to the AND circuit and the selection circuit, chooses either the AND signal or its complement signal as a rounded normalized mantissa according to the select_AND signal and its complement signal from the selection circuit.

6 Claims, 4 Drawing Sheets

METHOD AND APPARATUS FOR ROUNDING INTERMEDIATE NORMALIZED MANTISSAS WITHIN A FLOATING-POINT PROCESSOR

BACKGROUND OF THE INVENTION

1. Technical Field

The present invention relates to a method and apparatus for data processing in general, and in particular to a method and apparatus for rounding intermediate normalized mantissas. Still more particularly, the present invention relates to a method and apparatus for rounding intermediate normalized mantissas within a floating-point processor.

2. Description of the Prior Art

According to the IEEE 754 standard, floating-point numbers are represented by three elements, namely, a binary sign bit, a binary encoded exponent, and a binary encoded mantissa. In the case of a normalized floating-point number, the exponent is that which ensures the first digit of the mantissa is a logical one, except for special cases such as zero, infinities, and unrepresentable numbers.

Typically, within a floating-point processor, an intermediate normalized mantissa of a floating-point number must be rounded. The rounding process generally involves an increment operation followed by a selection for each bit of the output from a bit from an unincremented mantissa, a bit from an incremented mantissa, or a constant value. The constant value can either be a constant that is dictated by a special case (such as a zero result, an overflow, an underflow, or an invalid operation) or by the casting of the result to a lower precision (such as rounding the result to a single precision). The present disclosure provides an improved method and apparatus for rounding intermediate normalized mantissas within a floating-point processor.

SUMMARY OF THE INVENTION

In accordance with a preferred embodiment of the present invention, an apparatus for rounding intermediate normalized mantissas within a floating-point processor includes an AND circuit, a selection circuit, and a multiplexor. The AND circuit generates an AND signal and its complement from a normalized mantissa. The selection circuit generates a select_AND signal and its complement from the normalized mantissa. The multiplexor, which is coupled to the AND circuit and the selection circuit, chooses either the AND signal or its complement signal as a rounded normalized mantissa according to the select_AND signal and its complement signal from the selection circuit.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of floating-point processors. The floating-point processor may be, for example, a reduced instruction set computer (RISC) processor or a complex instruction set computer (CISC) processor. For the purpose of illustration, a preferred embodiment of the present invention, as described below, is implemented on a RISC processor, such as the PowerPC™ processor manufactured by International Business Machines Corporation of Armonk, New York.

Figure 1:
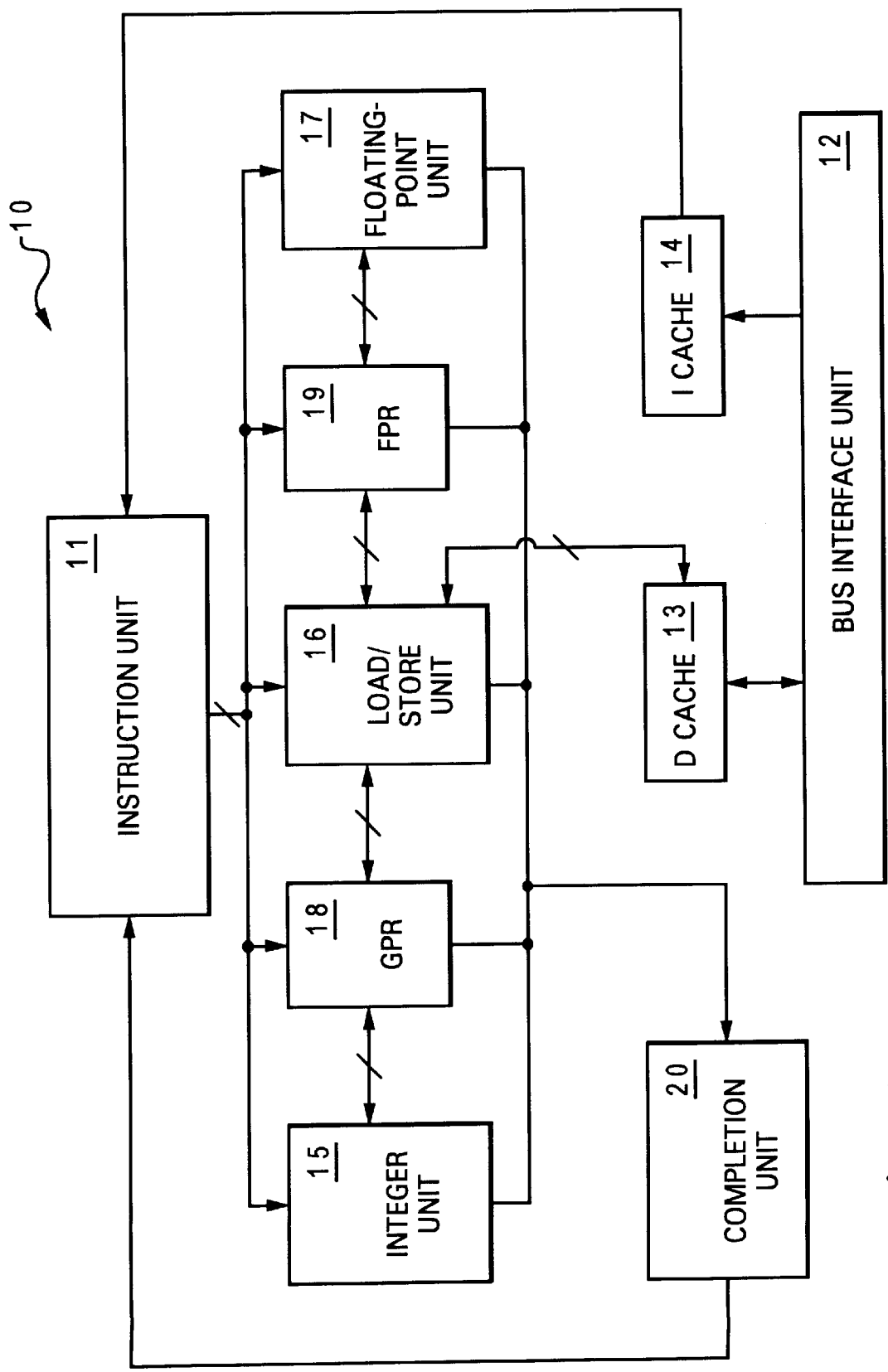
FIG. 1 is a block diagram of a floating-point processor in which a preferred embodiment of the present invention may be incorporated.

Referring now to the drawings and in particular to FIG. 1, there is depicted a block diagram of a floating-point processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes at least three execution units, namely, an integer unit 15, a load/store unit 16, and a floating-point unit 17. Each of execution units 15–17 can execute one or more classes of instructions, and all execution units 15–17 can operate concurrently during each processor cycle. After execution has terminated, any of execution units 15–17 store data results to a respective rename buffer, depending upon the instruction type. Then, any one of execution units 15–17 may signal a completion unit 20 that the execution of an instruction has finished. Finally, each instruction is completed in program order, and the result data are transferred from a respective rename buffer to a general purpose register 18 or a floating-point register 19, accordingly.

Figure 2:
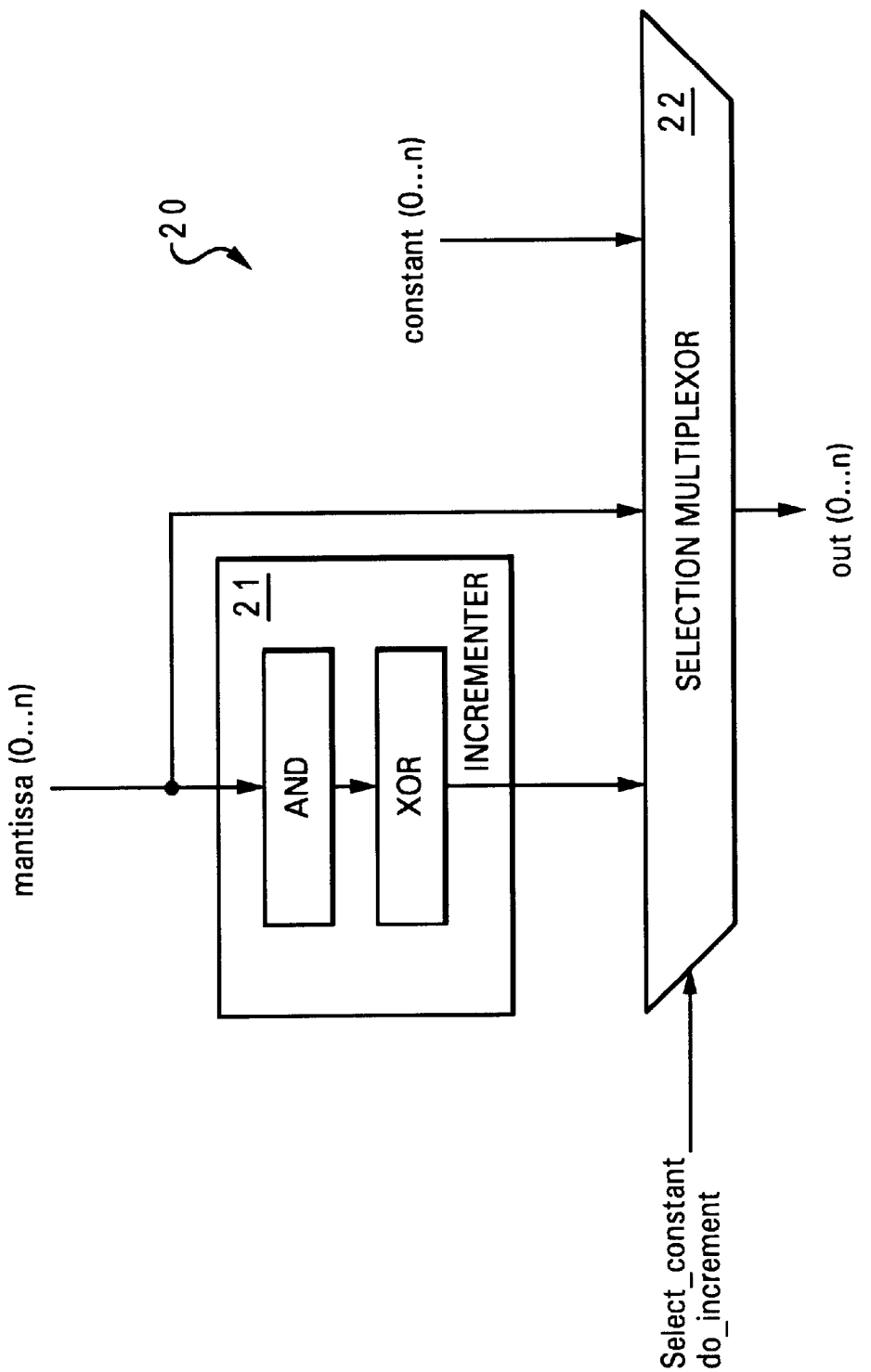
FIG. 2 is a block diagram of an apparatus for rounding an intermediate normalized mantissa, according to the prior art.

With reference now to FIG. 2, there is illustrated a block diagram of an apparatus for rounding an intermediate normalized mantissa, according to the prior art. As shown, a mantissa rounder 20 includes an incrementer 21 and a selection multiplexor 22. In the first stage of incrementer 21, logical AND operations are performed on all bits(i) of lesser significance within a normalized mantissa(0 . . . n), for each bit i, as follows:

logical_AND(i)=mantissa(i+1) AND mantissa(i+2) AND . . . mantissa(n−1) AND mantissa(n)
  logical_AND(n)=1.

In the second stage of incrementer 21, an incremented mantissa, incr_mantissa(0 . . . n), is formed, as follows:

incr_mantissa(i)=mantissa (i) XOR logical_AND(i)

Finally, the result of the mantissa rounding operation—a rounded normalized mantissa out(0 . . . n)—is formed by selection multiplexor 22, as follows:

out(i)=mantissa(i) AND $\overline{\text{do\_increment}}$ AND (select_constant) OR inc_mantissa(i) AND do_increment AND (select_constant) OR constant(i) AND select_constant.

Figure 3:
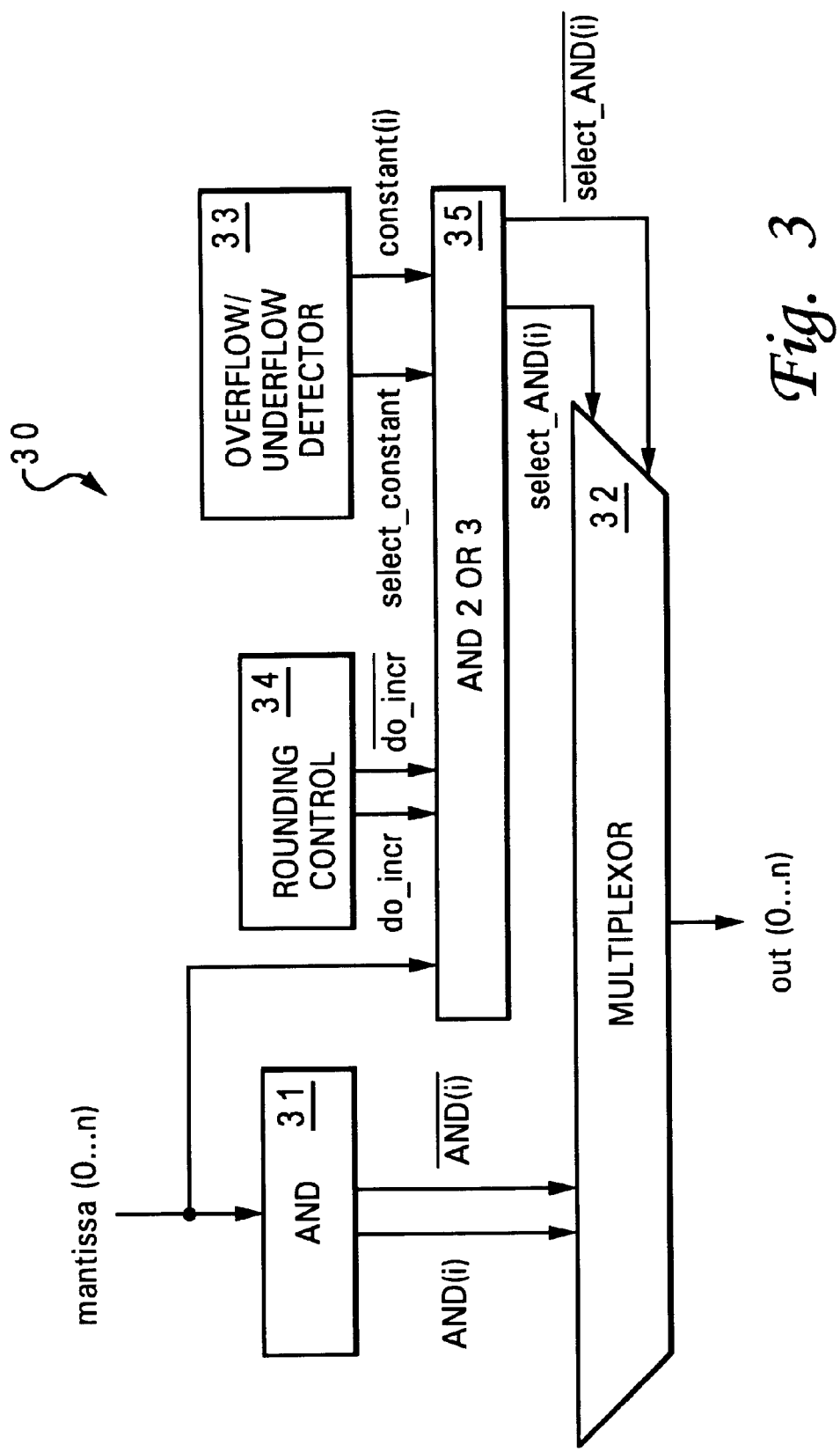
FIG. 3 is a block diagram of an apparatus for rounding intermediate normalized mantissas, in accordance with a preferred embodiment of the present invention.

Referring now to FIG. 3, there is illustrated a block diagram of an apparatus for rounding intermediate normalized mantissas, in accordance with a preferred embodiment of the present invention. As shown, a mantissa rounder 30 includes an AND circuit block 31, a multiplexor 32, an overflow/underflow detector 33, a rounding control 34, and an AND-2-OR-3 circuit block 35. A normalized mantissa, mantissa(0 . . . n) is sent to AND circuit block 31 and AND-2-OR-3 circuit block 35. Within AND circuit block 31, logical AND operations are performed on all bits(i) of lesser significance within the normalized mantissa, for each bit i, as follows:

logical_AND(i)=mantissa(i+1) AND mantissa(i+2) AND . . . mantissa(n+1) AND mantissa(n)

logical_AND(n)=1.

Overflow/underflow detector 33 generates a select_constant signal to indicate the detection of a special case. Special cases include overflow, underflow, zero result, infinite result, and NAN generation. For each possible special case, overflow/underflow detector 33 generates a constant, constant(0 . . . n). For example, when the floating point intermediate exponent value exceeds the limit of the valid exponent range, overflow/underflow detector 33 indicates an overflow condition in which it generates select_constant and produces a constant, constant(0 . . . n) that is a representation of an infinity of a maximum floating point value. Another example is when the floating point intermediate exponent value is less than the minimum of the valid exponent range, overflow/underflow detector 33 indicates an underflow condition in which it generates select_constant and produces a constant, constant(0 . . . n) that represents a zero. In a similar manner, when a special case such as a zero result, an infinite result, or a NAN generation is detected by overflow/underflow detector 33, overflow/underflow detector 33 generates a select_constant and a zero, an infinity, or a NAN representation, respectively, in constant(0 . . . n).

Rounding control 34 generates a do_increment signal or its complement $\overline{\text{do\_increment}}$ signal by examining the possible guard bits, round bits, and sticky bits, while determining the given specific operation result precision and rounding mode as to whether the result should be incremented. In the case that an increment is necessary, a do_increment signal is generated; otherwise, a $\overline{\text{do\_increment}}$ signal is generated.

After receiving the select_constant signal and the constant(i) signal from overflow/underflow detector 33 and a do_increment signal or a $\overline{\text{do\_increment}}$ signal from rounding control 34, AND-2-OR-3 circuit block 35 provides a select_AND(i) output and a $\overline{\text{select\_AND(i)}}$ output to multiplexor 32, as follows:

for bits i >0:

select_AND(i)=$\overline{\text{mantissa(i)}}$ AND do_increment OR mantissa(i) AND $\overline{\text{do\_increment}}$ OR select_constant AND constant(i)

$\overline{\text{select\_AND(i)}}$=mantissa(i) AND do_increment OR mantissa(i) AND $\overline{\text{do\_increment}}$ OR select_constant AND constant(i)

for bits i =0:

select_AND(i)=$\overline{\text{mantissa(i)}}$ OR AND(i) AND do_increment OR mantissa(i) AND $\overline{\text{do\_increment}}$ OR select_constant AND constant(i)

$\overline{\text{select\_AND(i)}}$=mantissa(i) AND do_increment OR mantissa(i) AND $\overline{\text{do\_increment}}$ OR select_constant AND constant(i).

Figure 4:
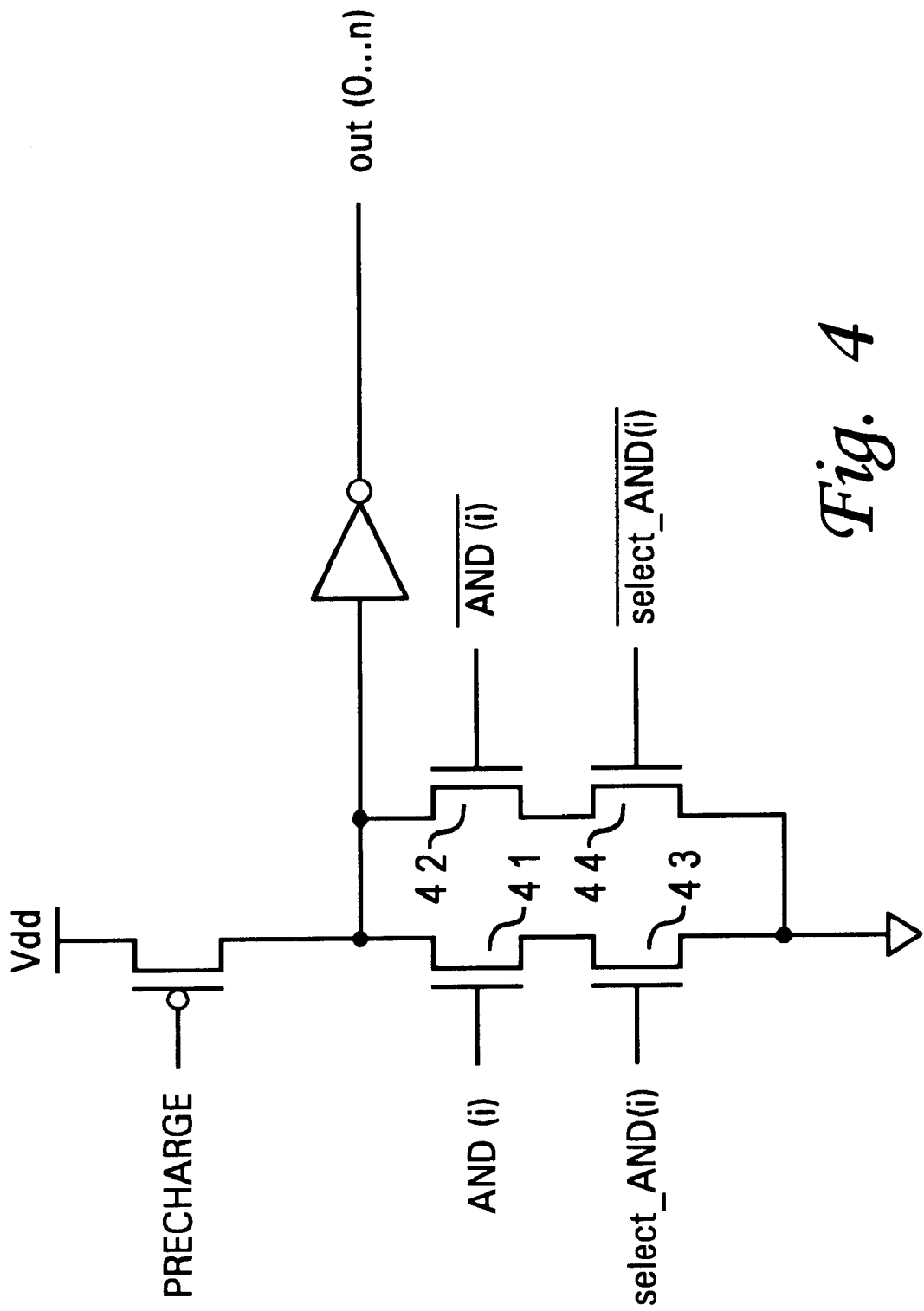
FIG. 4 is a schematic diagram of a dynamic logic circuit within a multiplexor that utilizes an XOR function to generate a rounded normalized mantissa, in accordance with a preferred embodiment of the present invention.

Finally, the result of the mantissa rounding operation, which is a rounded normalized mantissa out(0 . . . n), is formed by multiplexor 32. With reference now to FIG. 4, there is illustrated a schematic diagram of a dynamic logic XOR circuit within multiplexor 32 for generating a rounded normalized mantissa out(0 . . . n), in accordance with a preferred embodiment of the present invention. The rounded normalized mantissa out(0 . . . n) can be formed by four n-channel transistors 41–44 with AND(i), select_AND(i), $\overline{\text{AND(i)}}$, and $\overline{\text{select\_AND(i)}}$ separately as input, as follows:

out(i)=AND(i) AND select_AND(i) OR $\overline{\text{AND(i)}}$ AND $\overline{\text{select\_AND(i)}}$.

Both select_AND(i) and $\overline{\text{select\_AND(i)}}$ signals come from AND-2-OR-3 block 35 of FIG. 3, and both AND(i) and $\overline{\text{AND(i)}}$ signals come from AND circuit block 31 of FIG. 3.

As has been described, the present invention provides an improved method and apparatus for rounding intermediate normalized mantissas within a floating-point processor. The present invention removes the boolean XOR gates from the prior art incrementer. As a result, one level of logic can be eliminated from the mantissa rounder, thereby increasing performance, decreasing circuit area, and lowering circuit power.

While the invention has been particularly shown and described with reference to a preferred embodiment, it will be understood by those skilled in the art that various changes in form and detail may be made therein without departing from the spirit and scope of the invention.

What is claimed is:

1. An apparatus for rounding intermediate normalized mantissas, comprising:

an AND circuit for generating an AND signal and an $\overline{\text{AND}}$ signal, from a normalized mantissa;

a rounding control circuit for generating increment condition indicators;

an overflow/underflow detector for generating a constant force signal and a constant value;

a selection circuit for generating a select_AND signal and a $\overline{\text{select\_AND}}$ signal, based on said normalized mantissa, said increment condition indicator, said constant force signal and said constant value; and a multiplexor, coupled to said AND circuit and said selection circuit, for generating a rounded normalized mantissa by combining said AND and said $\overline{\text{AND}}$ signal from said AND circuit and said select_AND and said $\overline{\text{select\_AND}}$ signals from said selection circuit.

2. The apparatus according to claim 1, wherein said rounded normalized mantissa is generated either by logically ANDing said AND signal with said select_AND signal or by logically ANDing said $\overline{\text{AND}}$ signal with said $\overline{\text{select\_AND}}$ signal.

3. A floating-point processor capable of rounding intermediate normalized mantissas, comprising:

an instruction unit; and a floating-point unit having an AND circuit for generating an AND signal and an $\overline{\text{AND}}$ signal, from a normalized mantissa;

a rounding control circuit for generating increment condition indicators;

an overflow/underflow detector for generating a constant force signal and a constant value;

a selection circuit for generating a select_AND signal and a $\overline{\text{select\_AND}}$ signal, based on said normalized mantissa, said increment condition indicator, said constant force signal and said constant value; and a multiplexor, coupled to said AND circuit and said selection circuit, for generating a rounded normalized mantissa by combining said AND and said $\overline{\text{AND}}$ signal from said AND circuit and said select_AND and said $\overline{\text{select\_AND}}$ signals from said selection circuit.

4. The apparatus according to claim 3, wherein said rounded normalized mantissa is generated by said AND signal logical AND with said select_AND signal logical OR with said complement of said AND signal logical AND with said complement of said select_AND signal.

5. A method for rounding intermediate normalized mantissas within a floating-point processor, said method comprising the steps of:

generating an AND signal and an $\overline{\text{AND}}$ signal, from a normalized mantissa;

generating increment condition indicators;

generating a constant force signal and a constant value;

generating a select_AND signal and a $\overline{\text{select\_AND}}$ signal, based on said normalized mantissa, said increment condition indicator, said constant force signal and said constant value; and generating a rounded normalized mantissa by combining said AND and $\overline{\text{AND}}$ signal from said AND circuit and said select_AND and said $\overline{\text{select\_AND}}$ signals from said selection circuit.

6. The method according to claim 5, wherein said rounded normalized mantissa is generated either by logically ANDing said AND signal with said select_AND signal or by logically ANDing said $\overline{\text{AND}}$ signal with said $\overline{\text{select\_AND}}$ signal.

* * * * *

UNITED STATES PATENT AND TRADEMARK OFFICE
CERTIFICATE OF CORRECTION

PATENT NO. : 6,405,231 B1
DATED : June 11, 2002
INVENTOR(S) : Kevin John Nowka

It is certified that error appears in the above-identified patent and that said Letters Patent is hereby corrected as shown below:

Column 3,
Line 11, after the word "MANTISSA" please change "(n+1)" to -- (n-1) --.

Column 5,
Lines 5 through 9, please replace the entire paragraph with:
-- 4. The floating-point processor according to Claim 3, wherein said rounded normalized mantissa is generated either by logically *AND*ing said AND signal with said select_AND signal or by logically *AND*ing said AND signal with said select_AND signal. --.

Signed and Sealed this

Eighth Day of April, 2003

JAMES E. ROGAN
*Director of the United States Patent and Trademark Office*